(12) United States Patent
Raab et al.

(10) Patent No.: US 10,316,699 B2
(45) Date of Patent: Jun. 11, 2019

(54) LINE ARRANGEMENT FOR A MOTOR VEHICLE HAVING AT LEAST ONE LINE WHICH IS CONFIGURED AS A TEXTILE HOSE

(71) Applicant: MAN TRUCK & BUS OESTERREICH GesmbH, Steyr (AT)

(72) Inventors: Gottfried Raab, Perg (AT); Josef Klammer, Steyr (AT); Stefan Robausch, St. Ulrich bei Steyr (AT)

(73) Assignee: MAN Truck & Bus Österreich GesmbH, Steyr (DE)

( * ) Notice: Subject to any disclaimer, the term of this patent is extended or adjusted under 35 U.S.C. 154(b) by 56 days.

(21) Appl. No.: 15/217,662

(22) Filed: Jul. 22, 2016

(65) Prior Publication Data

US 2017/0022845 A1  Jan. 26, 2017

(30) Foreign Application Priority Data

Jul. 24, 2015 (AT) .................................. A 496/2015

(51) Int. Cl.
*F01K 23/10* (2006.01)
*F16L 59/153* (2006.01)
(Continued)

(52) U.S. Cl.
CPC ................ *F01K 23/10* (2013.01); *B32B 1/08* (2013.01); *B32B 3/08* (2013.01); *B32B 5/02* (2013.01);
(Continued)

(58) Field of Classification Search
CPC .. F01K 23/10; D03D 3/02; F16L 11/12; F16L 59/153; F16L 11/20; F16L 11/02; B32B 25/10; B32B 5/024; B32B 5/04; B32B 15/18; B32B 27/12; B32B 3/08; B32B 5/02; B32B 1/08; B32B 2307/734; B32B 2274/00; B32B 2307/306; B32B 2307/51; B32B 2307/304; B32B 2307/56;
(Continued)

(56) References Cited

U.S. PATENT DOCUMENTS 4,229,613 A * 10/1980 Braun .................. B29D 23/001
                                                138/103
4,281,510 A * 8/1981 Borjesgard ............. F01D 9/023
                                                60/39.465
(Continued)

FOREIGN PATENT DOCUMENTS

AT      159871     12/1940
AT      208161      3/1960
(Continued)

OTHER PUBLICATIONS

Search Report dated Nov. 24, 2016 which issued in the corresponding European Patent Application No. 16001617.6.

*Primary Examiner* — Hoang M Nguyen
(74) *Attorney, Agent, or Firm* — Cozen O'Connor (57) ABSTRACT

A line arrangement for a motor vehicle, preferably for a waste heat utilization system of a motor vehicle. The line arrangement includes one or more lines for conducting a fluid medium and is distinguished, in particular, by the fact that at least one line comprises at least one textile hose or is configured as at least one textile hose, and the textile hose has a textile structure and an inner sheath.

20 Claims, 4 Drawing Sheets

(51) Int. Cl.

| | |
|---|---|
| *B32B 25/10* | (2006.01) |
| *B32B 15/18* | (2006.01) |
| *B32B 1/08* | (2006.01) |
| *B60R 16/08* | (2006.01) |
| *D03D 3/02* | (2006.01) |
| *F16L 11/02* | (2006.01) |
| *F16L 11/20* | (2006.01) |
| *B32B 5/02* | (2006.01) |
| *B32B 5/04* | (2006.01) |
| *B32B 27/12* | (2006.01) |
| *B32B 3/08* | (2006.01) |
| *F16L 11/12* | (2006.01) |

(52) U.S. Cl.
CPC ............... *B32B 5/024* (2013.01); *B32B 5/04* (2013.01); *B32B 15/18* (2013.01); *B32B 25/10* (2013.01); *B32B 27/12* (2013.01); *B60R 16/08* (2013.01); *D03D 3/02* (2013.01); *F16L 11/02* (2013.01); *F16L 11/20* (2013.01); *F16L 59/153* (2013.01); *B32B 2274/00* (2013.01); *B32B 2307/304* (2013.01); *B32B 2307/306* (2013.01); *B32B 2307/51* (2013.01); *B32B 2307/56* (2013.01); *B32B 2307/7242* (2013.01); *B32B 2307/734* (2013.01); *B32B 2597/00* (2013.01); *B32B 2605/08* (2013.01); *F16L 11/12* (2013.01)

(58) Field of Classification Search
CPC ........ B32B 2307/7242; B32B 2605/08; B32B 2597/00; B60R 16/08

USPC ........................................... 60/614, 616, 618
See application file for complete search history.

(56) References Cited

U.S. PATENT DOCUMENTS

| | | | | |
|---|---|---|---|---|
| 4,410,013 | A * | 10/1983 | Sasaki | ................... B21C 37/154 138/113 |
| 9,046,201 | B1 * | 6/2015 | Theis | ...................... F16L 11/08 |
| 2005/0120715 | A1 * | 6/2005 | Labrador | ................ F01K 27/00 60/618 |
| 2006/0182914 | A1 | 8/2006 | Yasumatsu et al. | |
| 2009/0320953 | A1 * | 12/2009 | Fletcher | .................... B32B 1/08 138/148 |
| 2011/0048566 | A1 * | 3/2011 | Theis | .................... B29C 47/023 138/124 |
| 2011/0088959 | A1 * | 4/2011 | Corley | .................. F01K 23/065 180/65.245 |
| 2013/0112307 | A1 * | 5/2013 | Glejbol | ................ F16L 11/083 138/137 |

FOREIGN PATENT DOCUMENTS

| | | |
|---|---|---|
| AT | 218322 | 11/1961 |
| DE | 1738432 | 1/1957 |
| DE | 1815683 | 7/1960 |
| EP | 1437264 | 7/2004 |
| EP | 2312035 | 4/2011 |
| EP | 2476548 | 7/2012 |
| GB | 1589130 | 5/1981 |
| JP | 54-40329 | 3/1979 |
| WO | WO 2011/012374 | 2/2011 |

* cited by examiner

LINE ARRANGEMENT FOR A MOTOR VEHICLE HAVING AT LEAST ONE LINE WHICH IS CONFIGURED AS A TEXTILE HOSE

BACKGROUND OF THE INVENTION

1. Field of the Invention

The invention relates to a line arrangement for a motor vehicle, preferably a commercial vehicle, in particular a lorry or an omnibus. The line arrangement is configured, in particular, for a waste heat utilization system for the conversion of waste heat of an internal combustion engine into utilizable energy.

2. Description of the Related Art

In motor vehicles, media, sometimes also flammable media, often have to be guided past internal combustion engines, which are hot during operation, with constricted space conditions. In systems for waste heat utilization (Waste Heat Recovery=WHR) of internal combustion engines, steam circuit processes (for example, Clausius Rankine Cycle=CRC, Organic Rankine Cycle=ORC, etc.) are used. Here, a circuit medium is brought to a high pressure level in a feed pump and is evaporated and superheated in an evaporator. The steam is subsequently fed to an expansion machine that converts the energy stored in the steam into mechanical work. Downstream of the expansion machine, the relieved steam is liquefied in a condenser and is fed to the feed pump again. Line arrangements used to this end usually utilize, depending on the working medium, rigid stainless steel pipes with, for example, cutting ring fittings. As an alternative, high pressure hoses with suitable screw connections can also be used in regions at a low temperature. Stainless steel lines have the disadvantage, in particular, that they are firstly intensive with regard to material costs, weight, and manufacturing costs (for example, three-dimensional bending of the line contour). Secondly, expensive additional elements have to be installed, such as compensators for vibration decoupling and stainless steel cutting ring fittings for connecting the stainless steel pipes. High pressure hoses from the hydraulic field have, in particular, the disadvantage of low resistance to some ORC media and, moreover, a high weight. In addition, they are expensive and less flexible on account of the inner construction, in particular on account of braided wire inserts.

SUMMARY OF THE INVENTION

It is an object of the invention to provide a possibility for overcoming the abovementioned disadvantages and, as an alternative or in addition, to provide a line arrangement with improved functionality, in particular with regard to thermodynamic and/or safety aspects.

The invention provides a line arrangement for a motor vehicle, preferably for a waste heat utilization system of a motor vehicle. The motor vehicle is preferably a commercial vehicle, in particular a lorry or an omnibus. The waste heat utilization system can be based, for example, on the CRC technology (Clausius Rankine Cycle=CRC) or the ORC technology (Organic Rankine Cycle=ORC).

The line arrangement comprises one or more lines for conducting a fluid medium. The line arrangement is distinguished, in particular, by the fact that at least one line for conducting the medium comprises at least one textile hose or is configured as at least one textile hose, and the textile hose has a textile structure that encloses an inner sheath.

Within the context of the invention, the line can comprise, for example, one textile hose or at least two textile hoses, of which one textile hose runs within the other textile hose. The inner textile hose and the outer textile hose can expediently be configured as disclosed herein. The following description therefore expediently applies to a textile hose in general and to an inner textile hose and an outer textile hose. The textile hose extends over preferably the entire length of the line, expediently optionally with the exception of one or more interface devices.

The lines which were mentioned at the outset, in particular stainless steel lines and/or hydraulic hoses, can be replaced or enclosed by textile hoses within the context of the invention.

The inner sheath of the textile hose can, in particular, also be called an inner tube.

It is possible that the textile structure is a woven textile structure.

The inner sheath is configured from a preferably medium-resistant and/or medium-tight, in particular medium-impermeable, elastomer.

The inner sheath is configured, in particular, to ensure the sealed nature of the textile hose and/or to conduct the medium.

In contrast, the textile structure preferably serves to absorb the forces of the pressure of the medium.

It is possible that the textile hose is of dimensionally flexible configuration and therefore has substantially no dimensional stability.

It is likewise possible that the textile hose is of dimensionally stable configuration. To this end, the textile hose can have, for example, a spiral, with the result that the spiral expediently serves to achieve the dimensional stability.

It is possible that the spiral is woven into the textile hose, in particular into the textile structure.

The spiral is preferably a plastic spiral. It is possible that the textile hose encloses an inner line, for example a stainless steel line, and/or a hydraulic hose, and the inner line serves to conduct the fluid medium, with the result that the textile hose expediently does not come into contact with the medium in the normal operating state. However, in the case of a leak of the inner line (for example, leak, burst, etc.), the textile hose can ensure that the medium from the inner line is retained and/or is conducted to a predefined, in particular non-critical, location. However, the inner line can also be configured as a textile hose that is expediently as disclosed herein, with the result that the outer textile hose expediently does not come into contact with the medium in the normal operating state. However, in the case of a leak of the inner line which is likewise configured as a textile hose (for example, leak, burst, etc.), the outer textile hose can ensure that the medium from the inner line which is configured as a textile hose is retained and/or is conducted to a predefined, in particular non-critical, location.

The result of this is once again that, within the scope of the invention, the textile hose, in particular its inner sheath, does not necessarily have to come into contact with the fluid medium in the normal operating state, but rather, in particular, only when the inner line is leaking, for example has a leak or bursts. The textile hose can then expediently ensure that the medium is retained and conducted to a safe or non-critical location.

It is possible that the textile hose is provided with insulating material that can preferably extend over the substantially entire textile hose length and/or that can be arranged on the inner side of the inner sheath.

It is possible that the insulating material is expediently arranged between the inner sheath and the inner line (for example a stainless steel line or a hydraulic hose), with the result that it expediently fills the region between the inner sheath and the inner line. The insulating material might also extend between the inner textile hose and the outer textile hose.

The line arrangement is configured, in particular, for a waste heat utilization system for converting waste heat of an internal combustion engine into utilizable energy, in particular by a steam circuit.

It is possible that a textile hose serves to expediently fluidically connect an evaporator and an expansion machine, for example an expander. To this end, a textile hose that encloses an inner line (for example, a textile hose, a stainless steel line and/or a hydraulic hose) with insulating material arranged in between can be used, in particular.

It is likewise possible that a textile hose is used to expediently fluidically connect an expansion machine and a condenser. To this end, a preferably dimensionally stable textile hose can be used, in particular. To this end, a textile hose that encloses an inner line (for example, a textile hose, a stainless steel line and/or a hydraulic hose) can likewise be used.

It is possible that a textile hose serves to expediently fluidically connect a condenser and a delivery device, for example a pump, in particular a feed pump, for delivering the fluid medium. To this end, the textile hose itself, in particular its inner sheath, can serve to conduct the fluid medium, with the result that no inner line is required. As an alternative, it is likewise possible that the textile hose encloses an inner line (for example a textile hose, a stainless steel line and/or a hydraulic hose) and the inner line serves to conduct the fluid medium.

It is possible that a textile hose serves to expediently fluidically connect a delivery device, for example a pump, in particular a feed pump, for delivering the fluid medium, and an evaporator. To this end, the textile hose itself, in particular its inner sheath, can serve to conduct the fluid medium, with the result that no inner line is required. As an alternative, it is likewise possible that the textile hose encloses an inner line (for example, a textile hose, a stainless steel line, and/or a hydraulic hose) and the inner line serves to conduct the fluid medium.

It is possible that the textile hose makes contact on the outside with, or is at least conducted past in an adjoining manner, an internal combustion engine (for example, a combustion engine), an exhaust gas manifold and/or an exhaust gas turbocharger of a motor vehicle.

The fluid medium preferably comprises steam and/or a flammable medium.

The medium can comprise, for example, water or ethanol or other media which are used in CRC or ORC technology.

The textile hose itself consists of the textile structure and the inner sheath, expediently optionally with the exception of one or more interface devices.

It is possible that the textile hose is temperature-resistant up to at least 60° C., 80° C., 100° C., 120° C., 140° C., 160° C., 180° C., 200° C., 220° C., or 240° C. As an alternative or in addition, the textile hose can be pressure-resistant up to at least 0.7 bar, 1 bar, 4 bar, 8 bar, 16 bar, 32 bar, or 48 bar.

It is possible that the textile hose is of elastic configuration, for example in its longitudinal and/or radial direction, and can therefore expediently expand and contract.

It is possible that the line arrangement has at least two textile hoses, of which at least one textile hose runs within the other textile hose, with the result that, in the case of a leak of the inner textile hose, the outer textile hose preferably ensures that the medium is retained and/or is conducted to a predefined location. The outer and the inner textile hose can expediently be configured as disclosed herein.

The inner textile hose and the outer textile hose preferably run substantially coaxially, with the result that their longitudinal axes expediently substantially coincide.

A vacuum is usually produced during cooling of the medium in the line or lines, by way of which vacuum medium continues to flow out of a compensating container (expedient shutting-off operation). The textile hose can therefore be of elastic, for example non-dimensionally stable, configuration, with the result that it can contract, in particular, as a result of vacuum, as a result of which the compensating container can be, for example, of smaller dimensions or can even be dispensed with. The compensating container can be reduced in size, in particular, substantially by the amount, by which the textile hose can contract.

It is to be mentioned that the line arrangement can comprise one or more textile hoses as disclosed herein. Thus, for example, a single textile hose can form a line, a, for example, stainless steel line or a hydraulic hose can run within a textile hose, or a textile hose can run within another textile hose.

The invention is not restricted to a line arrangement, but rather also comprises a waste heat utilization system, in particular for a motor vehicle, for converting waste heat of an internal combustion engine into utilizable energy, for example by means of a steam circuit, having a line arrangement as disclosed herein.

The invention likewise comprises a motor vehicle having a waste heat utilization system as disclosed herein.

The motor vehicle is preferably a commercial vehicle, in particular a lorry or an omnibus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described preferred embodiments and features of the invention can be combined with one another. Other advantageous developments of the invention are disclosed in the subclaims or result from the following description of preferred embodiments of the invention in conjunction with the appended figures, in which:

DETAILED DESCRIPTION OF THE PRESENTLY PREFERRED EMBODIMENTS

The embodiments shown in the figures coincide in part, with the result that similar or identical parts are provided with the same reference numerals and reference is also made to the description and the figures of the other embodiments in order to explain them, so as to avoid repetitions.

Figure 1:
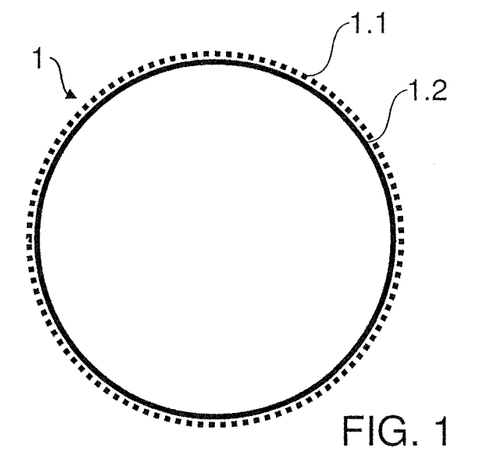
FIG. 1 is a diagrammatic cross-sectional view of a textile hose for a line arrangement.

FIG. 1 shows a diagrammatic cross-sectional view of a line configured as a textile hose 1 for conducting a fluid medium. The textile hose 1 has a textile structure 1.1, in particular a woven textile structure, and a medium-resistant inner sheath 1.2. The textile structure 1.1 encloses the inner sheath 1.2. The inner sheath 1.2 serves to conduct and therefore to come into contact with the fluid medium and is expediently configured to ensure the sealed state of the textile hose 1. To this end, the inner sheath 1.2 can be configured from an elastomer. In contrast, the textile structure 1.1 expediently serves to absorb the forces of the pressure of the fluid medium.

In the embodiment shown in FIG. 1, the textile hose 1 itself, in particular its inner sheath 1.1, serves to conduct the fluid medium. A separate inner line for conducting the fluid medium, such as a stainless steel pipe or a hydraulic line, is not present.

Figure 2:
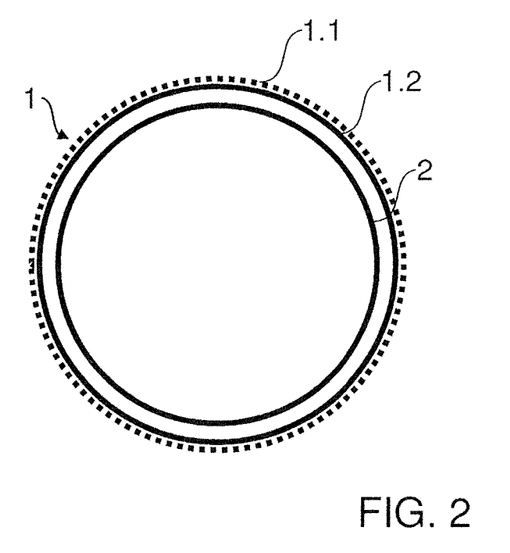
FIG. 2 is a diagrammatic cross-sectional view of a textile hose that encloses an inner line for a line arrangement.

FIG. 2 shows a diagrammatic cross-sectional view of a textile hose 1 that encloses an inner line 2. The textile hose 1 can be constructed as in the embodiment described with reference to FIG. 1.

The textile hose 1 is of dimensionally stable configuration, preferably by a spiral configured, for example, as a plastic spiral and can be woven into the textile structure 1.1.

In contrast to the embodiment which is shown in FIG. 1, the textile hose 1 does not come into contact with the fluid medium in a normal operating state, since the fluid medium is conducted by the inner line 2 in the normal operating state. The inner line 2 can be, for example, a stainless steel pipe or a hydraulic hose for conducting the fluid medium.

In the embodiment shown in FIG. 2, the textile hose 1 serves, in particular, in the case of a leak of the inner line 2 (for example, a burst or another leak), to conduct the fluid medium that exits therefrom to a safe region, in particular a region at a lower temperature.

Figure 3:
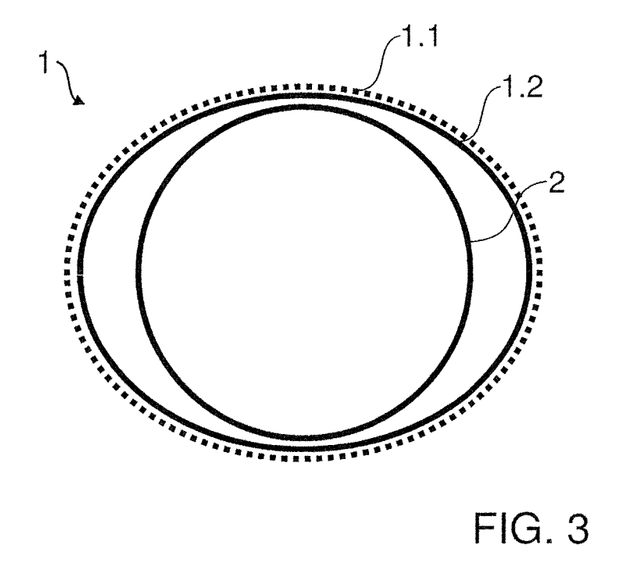
FIG. 3 is a diagrammatic cross-sectional view of a textile hose that encloses an inner line for a line arrangement.

FIG. 3 shows a diagrammatic cross-sectional view of a textile hose 1 that encloses an inner line 2. The embodiment shown in FIG. 3 coincides for the large part with the embodiment shown in FIG. 2, the textile hose 1 in FIG. 3 not being of dimensionally stable configuration, but rather of dimensionally flexible configuration and therefore, as it were, without a substantial inherent rigidity.

Figure 4:
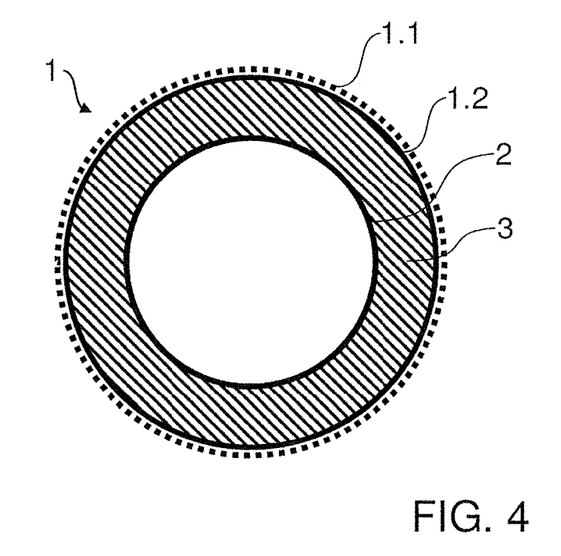
FIG. 4 is a diagrammatic cross-sectional view of a textile hose that encloses an inner line with insulating material that lies in between for a line arrangement.

FIG. 4 shows a diagrammatic cross-sectional view of a textile hose 1 that encloses an inner line 2. One special feature of this is that insulating material 3 is arranged between the textile hose 1, in particular its inner sheath 1.2, and the inner line 2, with the result that the region between the inner sheath 1.2 and the inner line 2 is filled by way of the insulating material 3.

Figure 5:
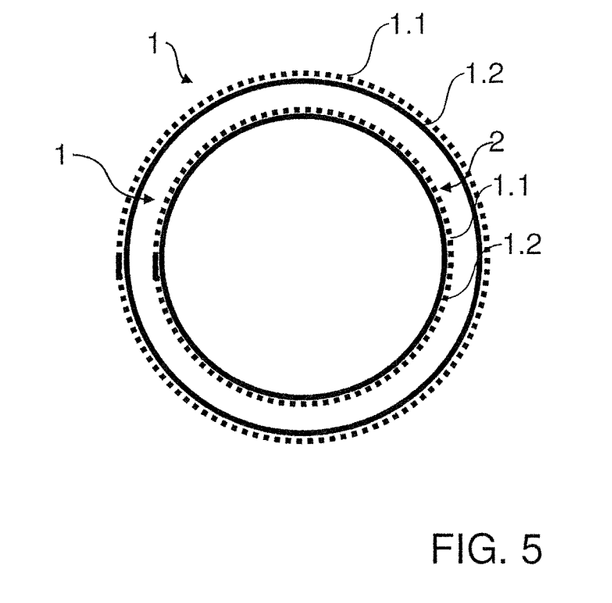
FIG. 5 is a diagrammatic cross-sectional view of a textile hose that encloses an inner line for a line arrangement.
Figure 6:
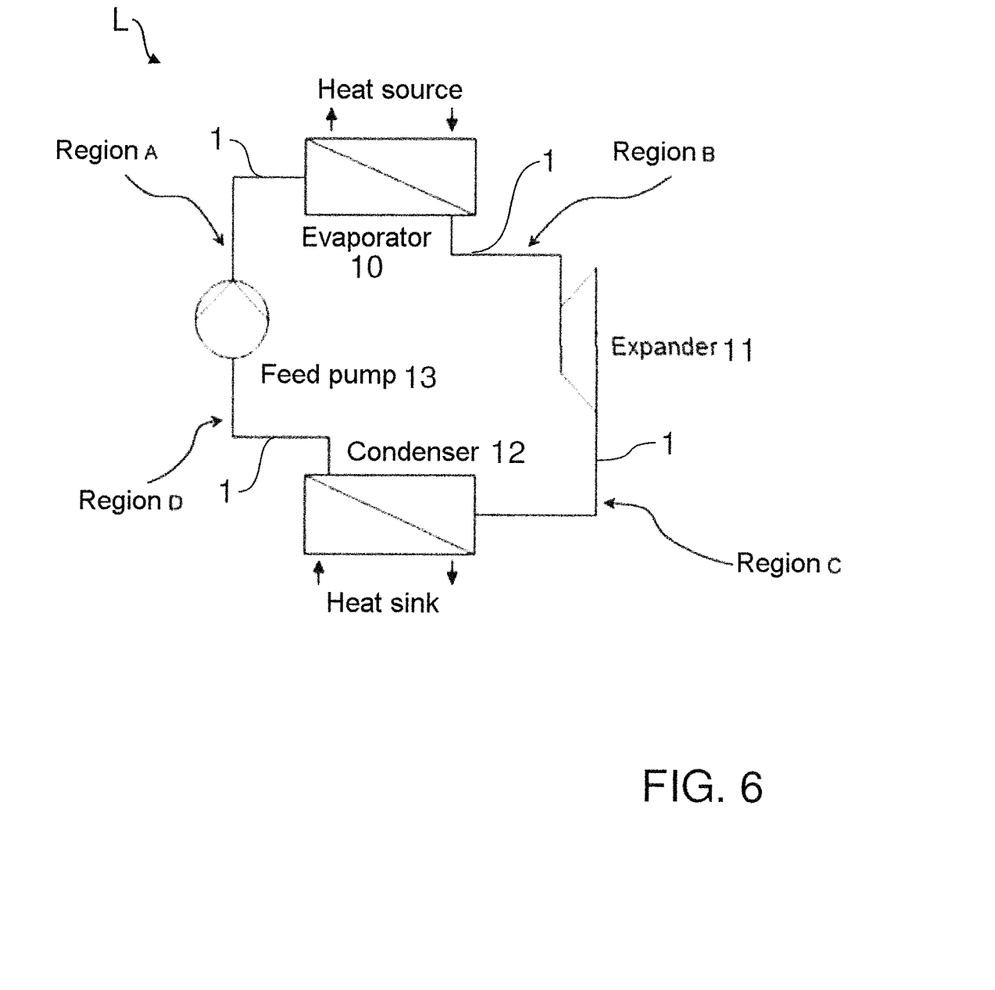
FIG. 6 is a waste heat utilization system for a motor vehicle.

FIG. 5 illustrates a diagrammatic cross-sectional view of a textile hose 1 that encloses an inner line 2. One special feature is that the inner line 2 is likewise configured as a textile hose 1 with a textile structure 1.1 and an inner sheath 1.2. As a consequence, the line is formed by way of two textile hoses 1, of which one textile hose 1 runs within another textile hose 1, with the result that, in the case of a leak of the inner textile hose 1, the outer textile hose 1 preferably ensures that the medium is retained and/or conducted to a predefined location. FIG. 6 shows a line arrangement L for a waste heat utilization system for converting waste heat of a motor vehicle internal combustion engine into utilizable energy, expediently by a steam circuit.

The waste heat utilization system comprises an evaporator 10, an expansion machine (expander) 11, a condenser 12, and a delivery device 13, for example a feed pump, for delivering the fluid medium.

The line arrangement L which is shown in FIG. 6 can expediently be divided into the regions A, B, C and D.

Region A identifies a low temperature/high pressure region (LT/HP) or a region from the outlet of the feed pump 13 as far as the inlet of the evaporator 10. An operating temperature level of from 60° C. to 120° C. and an operating pressure level of from 10 barabs to 40 barabs are customary there.

A line construction according to FIG. 1 can be used, a dimensionally stable or non-dimensionally stable textile hose 1 being possible on account of the low temperatures. A line construction according to FIG. 2 or 3 can also be used, preferably with a dimensionally stable variant, or according to FIG. 5. The embodiment according to FIG. 2, 3, or 5 may be suitable, in particular, where a leak has to be avoided for safety reasons. A medium jet which escapes from the inner line 2 (for example, stainless steel pipe, hydraulic hose or textile hose 1) can be retained and conducted to a non-critical location by way of the enclosing textile hose 1. For example, it can thus be ensured that, in the case of a leak, no flammable medium comes into contact with a hot exhaust gas manifold or turbocharger, but rather is discharged to a cold region.

An embodiment according to FIG. 4 is not expedient on account of the low temperatures, the line construction according to FIG. 1 per se already having a higher insulating action than, for instance, a stainless steel line.

Region B identifies a high temperature/high pressure region (HT/HP) or a region from the outlet of the evaporator 10 as far as the inlet of the expansion machine 11. An operating temperature level of from 180° C. to 250° C. and an operating pressure level of from 10 barabs to 40 barabs are customary there.

A line construction according to FIG. 4 can be used, it being possible for the inner line 2 to be a stainless steel line, for example, on account of the high temperatures. The textile hose 1 can be of dimensionally stable or non-dimensionally stable configuration. On account of the enclosing textile hose 1, the embodiment according to FIG. 4 may be suitable, in particular, where a leak of the medium has to be avoided for safety reasons. A medium vapour, which escapes from the inner line 2 into the insulating material 3, can be retained and conducted to a non-critical location by way of the enclosing textile hose 1. For example, it can be thus ensured that, in the case of a leak, no flammable medium vapour comes into contact with a hot exhaust gas manifold or turbocharger, but rather is discharged to a cold region.

A line construction according to FIG. 1, 2, or 3 is not expedient on account of the required insulation.

Region C identifies a high temperature/low pressure region (HT/LP) or a region from the outlet of the expansion machine 11 as far as the inlet of the condenser 12. An operating temperature level of from 120° C. to 250° C. and an operating pressure level of from 0.7 barabs to 5 barabs are customary there.

A line construction according to FIG. 1 can be used, a dimensionally stable textile hose 1 being advantageous on account of the temperatures. Furthermore, an embodiment according to FIG. 2 or 3 can be used. The line construction according to FIG. 2 or 3 may be suitable, in particular, where a leak has to be avoided for safety reasons. A medium jet that escapes from the inner line 2 can be retained and conducted to a non-critical location by way of the enclosing textile hose 1. For example, it can thus be ensured that, in the case of a leak, no flammable medium comes into contact with a hot exhaust gas manifold or turbocharger, but rather is discharged to a cold region.

An embodiment according to FIG. 4 is not expedient on account of the heat dissipation which is desired in region C.

Region D identifies a low temperature/low pressure region (LT/LP) or a region from the outlet of the condenser 12 as far as the inlet of the feed pump 13. An operating temperature level of from 60° C. to 120° C. and an operating pressure level of from 0.7 barabs to 5 barabs are customary there.

A line construction according to FIG. 1 can be used, a dimensionally stable textile hose 1 being possible on account of the low temperatures. Furthermore, an embodiment according to FIG. 2 or 3 is possible, a dimensionally stable textile hose 1 once again being possible. Furthermore, an embodiment according to FIG. 5 is possible. The embodiment according to FIG. 2, 3 or 5 may be suitable, in particular, where a leak has to be avoided for safety reasons. A medium jet which escapes from the inner line 2 (for example, a stainless steel pipe, hydraulic hose or textile hose 1) can be retained and conducted to a non-critical location by way of the enclosing textile hose 1. For example, it can be thus ensured that, in the case of a leak, no flammable medium comes into contact with a hot exhaust gas manifold or turbocharger, but rather is discharged to a cold region.

A line construction according to FIG. 2 is also possible, it being possible for a non-dimensionally stable and therefore dimensionally flexible textile hose 1 to be used. A vacuum is usually produced when cooling the medium in the line or lines, by way of which vacuum medium continues to flow from a compensating container into the lines (switching-off operation). In the case of the embodiment as a non-dimensionally stable, expediently elastic textile hose 1, the line can contract, as a result of which the compensating container can be of smaller dimensions or can be dispensed with.

A line construction according to FIG. 4 is not expedient on account of the low temperatures, the embodiment as a textile hose 1 according to FIG. 1 per se already having a higher insulating action than, for instance, a stainless steel line.

The invention is not restricted to the above-described preferred embodiments. Rather, a multiplicity of variants and modifications are possible which likewise use the concept of the invention and therefore likewise fall within the scope of protection. Moreover, the invention also claims protection for the subject matter and the features of the subclaims, independently of the features and claims which are referred to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A waste heat utilization system for converting waste heat of an internal combustion engine into utilizable energy, comprising
    an evaporator;
    an expansion machine;
    a condenser;
    a delivery device; and
    a line arrangement having:
        at least one textile hose having:
        a textile structure;
        an inner sheath; and
        an inner line enclosed by the textile hose and configured to conduct a fluid medium,
        wherein in case of a leak of the inner line the textile hose is configured to at least one of retain the fluid medium and conduct the fluid medium to a predefined location,
    wherein the at least one textile hose serves for fluid connection of at least one of the following:
        the evaporator and expansion machine;
        the expansion machine and condenser;
        the condenser and a delivery device for delivering the fluid medium; and
        the delivery device for delivering the fluid medium and an evaporator.

2. The waste heat utilization system according to claim 1, wherein the textile structure is configured as a woven textile structure.

3. The waste heat utilization system according to claim 1, wherein the inner sheath is configured from at least one of a medium-resistant elastomer and a medium-tight elastomer.

4. The waste heat utilization system according to claim 1, wherein the textile structure is configured to absorb pressure forces of the fluid medium.

5. The waste heat utilization system according to claim 1, wherein the textile hose has a dimensionally flexible configuration.

6. The waste heat utilization system according to claim 1, wherein the textile hose has a dimensionally stable configuration.

7. The waste heat utilization system according to claim 6, wherein the textile hose has a spiral woven into the textile hose for achieving the dimensionally stable configuration.

8. The waste heat utilization system according to claim 1, wherein the inner line is formed by at least one of the following:
    a) a stainless steel line;
    b) a hydraulic hose; and
    c) a textile hose.

9. The waste heat utilization system according to claim 1, wherein the textile hose is provided with an insulating material.

10. The waste heat utilization system according to claim 8, wherein the insulating material is arranged between the inner sheath and the inner line.

11. The waste heat utilization system according to claim 1, wherein the textile hose one of makes contact with or is at least conducted past in an adjoining manner, at least one of an internal combustion engine, an exhaust gas manifold, and an exhaust gas turbocharger.

12. The waste heat utilization system according to claim 1, wherein the fluid medium comprises one of steam and a flammable medium.

13. The waste heat utilization system according to claim 1, wherein the textile hose is of elastic configuration in at least one of its longitudinal direction and its radial direction.

14. The waste heat utilization system according to claim 1, wherein the textile hose can contract as a result of vacuum, as a result of which a compensating container can be one of a smaller dimension and dispensed with.

15. The waste heat utilization system according to claim 1, wherein the textile hose is at least one of:
   temperature-resistant up at least one of 60° C., 80° C., 100° C., 120° C., 140° C., 160° C., 180° C., 200° C., 220° C. and 240° C. and
   pressure-resistant up to at least one of 0.7 bar, 1 bar, 4 bar, 8 bar, 16 bar, 32 bar and 48 bar.

16. The waste heat utilization system according to claim 1,
   wherein the line arrangement comprises at least two textile hoses,
   wherein at least one textile hose runs within another textile hose, and
   wherein, in case of a leak of an inner textile hose, an outer textile hose is configured to one of retain the fluid medium and conduct the fluid medium to a predefined location.

17. The waste heat utilization system for converting waste heat of an internal combustion engine into utilizable energy according to claim 1, wherein the waste heat utilization system is a steam circuit.

18. The waste heat utilization system according to claim 1, wherein the textile hose is pressure-resistant up to at least one of 0.7 bar, 1 bar, 4 bar, 8 bar, 16 bar, 32 bar, and 48 bar.

19. A motor vehicle, comprising:
   a waste heat utilization system for converting waste heat of an internal combustion engine into utilizable energy, comprising:
      an evaporator;
      an expansion machine;
      a condenser;
      a delivery device; and
      a line arrangement having:
         at least one textile hose having:
            a textile structure;
            an inner sheath; and
            an inner line enclosed by the textile hose and configured to conduct a fluid medium,
            wherein in case of a leak of the inner line the textile hose is configured to at least one of retain the fluid medium and conduct the fluid medium to a predefined location,
      wherein the at least one textile hose serves for fluid connection of at least one of the following:
         the evaporator and expansion machine;
         the expansion machine and condenser;
         the condenser and a delivery device for delivering the fluid medium; and
         the delivery device for delivering the fluid medium and an evaporator.

20. The motor vehicle according to claim 19, wherein the waste heat utilization system is a steam circuit.

* * * * *

UNITED STATES PATENT AND TRADEMARK OFFICE
CERTIFICATE OF CORRECTION

PATENT NO. : 10,316,699 B2
APPLICATION NO. : 15/217662
DATED : June 11, 2019
INVENTOR(S) : Gottfried Raab et al.

It is certified that error appears in the above-identified patent and that said Letters Patent is hereby corrected as shown below:

On the Title Page

Item (73) Assignee should read: MAN Truck & Bus Österreich GsmbH, Steyr (AT)

Signed and Sealed this
Twenty-third Day of July, 2019

Andrei Iancu
*Director of the United States Patent and Trademark Office*